3,382,093
FLUIDIZED BED COATING OF FRAGILE BODIES
Herman Nack, Columbus, Ohio, assignor to The Battelle Development Corporation, Columbus, Ohio, a corporation of Delaware
Continuation-in-part of application Ser. No. 275,502, Apr. 25, 1963. This application Nov. 22, 1965, Ser. No. 516,199
10 Claims. (Cl. 117—100)

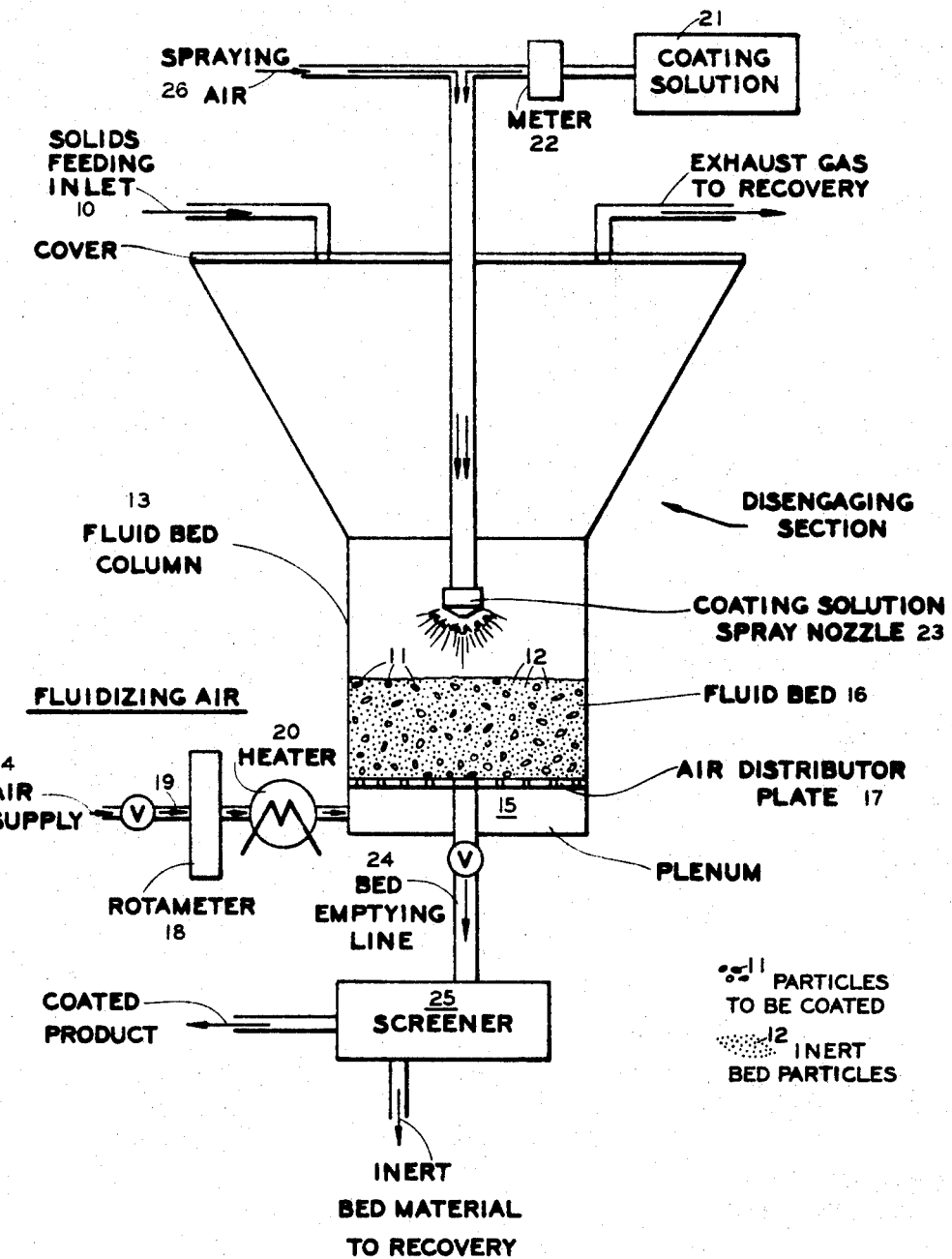
SCHEMATIC OF FLUIDIZING BED COATING PROCESS
INVENTOR
HERMAN NACK

# United States Patent Office 3,382,093
Patented May 7, 1968

This application is a continuation-in-part of my United States patent application Ser. No. 275,502, filed Apr. 25, 1963, and entitled, "Coating of Fragile Articles", now abandoned.

This invention concerns the coating of fragile articles supported in a fluidized bed of particulate solids. More particularly, the invention includes coating fragile or easily frangible pressed composites of particulate materials, while they are supported in fluidized particulate solids, whereby the fluidized particulate solids cushion such fragile composites to prevent breakage and substantial attrition thereof during the coating process.

Numerous processes are known for coating various compressed particulate materials. Conventional pan-coating techniques for granular medicants and pills have long been known. In such processes, for example, coating compositions are applied to pressed granular and powder pill-shaped composites while the composites are being rolled or tumbled within a pan holding the coating material. This continues until build-up of a desired coating thickness is obtained. This process requires composites which are not too fragile and frequently involves a relatively lengthy time to build up the desired coating thickness. Moreover, this process is essentially an art wherefore experienced coaters are necessary to insure high-quality, uniformly coated products.

In recent years, other coating processes have been proposed. One such process described by Francis Chilson in "Drug and Cosmetic Industry," February 1959, provides high-quality uniform coatings on pressed particulate material composites, while they are fluidized. The time required is a fraction of the time required by pan-coating techniques. However, even recently developed coating techniques are disadvantageous with some materials. Where the pressed particulate material composites being coated are fragile, fluidization leads to breakage and rapid attrition. Corners, fragments, and portions break off fragile articles during fluidization. Such attrition detracts from the favorable economic aspects of this fluidization coating process and also leads to a nonuniform product. Nonuniformity in the coated product is apparent not only from variance in product size but in the ratio of coating to core material.

For some applications, it is highly desireble that fragile composites be coated. It is known that lightly pressed composites of powders and like particles break and disintegrate more easily than hard and heavily pressed composites and that rapid disintegration and dissolution are desirable for some end applications. Coating of such fragile compressed particulate materials is desirable for a number of purposes. For example, one may coat such fragile articles to protect them from breakage and attrition during handling and shipping. A protective or binder-type coating may be applied to mask an unpleasant taste, odor, or color; or to impart a pleasant taste, odor, or color for a particular end application; or to enable dissolution and release of a core material only in certain environments, such as by an enteric coating on a medicant; or to prevent absorption of moisture; or to provide an aesthetic appearance; and for numerous diverse reasons well known and obvious to those skilled in the art.

It is an object of the present invention to provide a process for coating fragile articles.

It is another object to coat easily frangible articles while they are suspended in a fluidized bed of solid particles.

It is a further object of the invention to provide a process for coating fragile compressed particulate materials while they are cushioned against breakage and attrition by dispersion in a fluidized bed of particulate solids.

It is still a further object to support fragile articles in fluidized particulate solids and, while so supported, to coat the fragile articles by applying thereto a liquid coating composition.

All these, and other objects, will be apparent from the description and the drawing.

In general the present invention is a fluidized-bed coating process for fragile bodies. Such fragile bodies are introduced into a fluidized bed of particles having a greater density than the fragile bodies and an average particle size that is smaller than the fragile bodies. Coating is then effected by spray coating a solution onto the bed that consists of the coating material and a volatile liquid. The volatile liquid readily volatilizes leaving the coated bodies. A preferred embodiment of the present invention is the use of a fluidized bed of particles that are no greater in size than ⅕ the size of the fragile bodies.

The single figure of the drawing is an illustrative cross-sectional schematic view of a fluidized-bed spray-coating apparatus containing a fluidized bed of particulate solids and fragile bodies being spray coated in accordance with the method of the present invention.

In a specific embodiment of the invention, a gas, such as air, is employed to fluidized finely divided solids, such as an inert powdered material; fragile articles to be coated, for example, in the form of pills, pellets, lozenges, tablets, and the like, are added to the fluidized particulate solids so that there is provided a fluidized bed made up primarily of fluidized solids having suspended and dispersed therein the fragile articles to be coated; and then a liquid coating composition is introduced, such as by spraying a solution of the coating composition into the fluidized bed. In such a process, the introduced liquid coating composition coats the fragile articles and the fluidizing gas evaporates liquid constituents of the coating composition to leave a solid coating on the fragile articles. A prime feature of the process is that, while being coated, the fragile articles are suspended in a primary fluidized bed of particulate solids which serves to cushion and prevent breakage and attrition of the fragile articles. Following build-up of a desired coating on the fragile articles, the coated articles are separated from the particulate solids with which they were fluidized during the coating.

A fluidized bed of discrete solid particles may be provided by flowing a gas upwardly therethrough. The size and weight of the particles and the velocity and nature of the gas are such that the force exerted by the flowing gas is sufficient to counterbalance the gravitational force on the free particles and to expand the bed, thus allowing random movement of the particles, but is insufficient to provide a flowing stream of particles entrapped in the gas. Fluidized beds are well known. It is possible to fluidize particles of a range of sizes. It also is possible to fluidize two or more materials at the same time. For example, a powdered catalyst can be fluidized along with an inert solid powder of a smaller particle size than the catalyst. Thus, by employing two or more materials of different densities and/or sizes or shapes, it is possible through choice of suitable fluidization conditions to place both concurrently in a fluidized state.

Fluidized particulate materials and particularly fine materials have many characteristics of a liquid. Within the fluid-bed chamber, a bed of fluidized particles resembles a boiling liquid. When larger particles or fragile bodies are introduced into such a bed, if the density of such bodies is less than the average density of the bed, these particles tend to float in the bed much in the manner they would float in a liquid. If the density of such particles or bodies is greater than the average density of the bed or even substantially equivalent thereto, the fragile bodies will tend to sink to the bottom of the fluid-bed chamber. Consequently, a prerequisite for fluidizing fragile bodies in a bed of fluidized particulate is that the average density of the fluidized bed be greater than the density of the fragile bodies.

If bodies or particles are introduced into a boiling liquid of slightly greater density such bodies will sink into the liquid and rise and fall with the currents created by the churning action caused by boiling. The same is true when bodies are introduced into a fluidized bed of particles of greater density except the random distribution and movement of such bodies within the bed are usually far more pronounced.

All fluidized beds of particles require an upward flow of gas of sufficient velocity to overcome the force of gravity of the individual fluidized particles. Where the particles are very fine, fluidization may be accomplished at low fluidizing gas velocities. Such a bed is relatively dense, the particles have less velocity of movement (low momentum). Such a bed having relatively dense (a large number of particles per cubic measurement) is capable of supporting a wide range of fragile bodies since its density is more likely to be greater than the bodies it is called upon to support. Further, the actual support afforded the fragile body is by the multiple striking of such a body by the fluidized particles. Where the particles are small or relatively fine this bombardment has a cushioning effect which prevents breakage such as occurs where the bodies themselves are fluidized and strike one another in the fluidized state with considerable impact. Where the particles are particularly fine, the multiple or more frequent bombardment with fine low movement particles offer a greater and more desirable cushioning effect. Where the velocity of the fluidizing gases is increased over the minimum requirements for fluidization, the average density of the bed decreases and the velocity and momentum of the individual particles increases. The more rapidly moving particles strike the fragile bodies with more force. However, so long as the average density of the bed is greater than the density of the bodies and the particles are smaller than the fragile bodies some beneficial cushioning effect will be experienced.

The hardness and density properties of the fluidized-bed particles are of importance only as to the effect such properties may have on the average density of the bed. Dense particles will raise the average density of a given depth bed but will not materially affect the momentum of the individual particles or the overall cushioning effect of the bed. Likewise, the hardness of the particles will not materially alter momentum, density or cushioning effect. Where fine particles effect low velocity impact on a fragile body, the desired cushioning effect is enjoyed regardless of the specific physical or mechanical properties of the individual particles.

The differences in density between the bed and the fragile bodies is also of little significance so long as the fluidized bed is the denser. Where the fluidized bed is very dense relative to the fragile bodies, such bodies may tend to migrate to nearer the top of the bed than where the density of the bed and the fragile bodies are more nearly the same. However, so long as the bed supports the fragile particles effective spray coating may be accomplished. Where the fragile particles are of a greater specific gravity than the bed, however, stratification of the particles and the fragile bodies prevents the desired cushioning effect.

As stated above, some beneficial cushioning is experienced whenever the average size of the fluidized particles is smaller than the fragile bodies being coated however small the difference in size between the particles and fragile bodies may be. However, it is preferable that the fluidized particles be no greater in average size than about ⅕ the diameter of the fragile bodies.

It is acknowledged that fluidized particles are never of exact uniform size so that the coating process of the present invention requires only that the average diameter of such particles be less than the average diameter of the fragile body and preferably such average particle diameter or size will be 20 percent or less than that of the fragile bodies. Nothing in this specification suggests or infers that either the fragile bodies or the fluidized particles need be substantial spheroids but either may be variously shaped, such size requirements being relative only.

It will be noted that a requirement of the method of the present invention is that the average density (relative density) of the fluidized bed be greater than the density of the fragile body. The relative density of any specified area of the bed depends, of course, on the relative density of the individual particles within such an area. The fluidizing gases within such an area would also contribute to such a relative density, however, such a contribution is so small as to be negligible. Thus, the density of such an area or bed is determined by the particles and since the density of the bed must be greater than the fragile bodies, the density of the particles themselves will be substantially greater than the density of the fragile bodies.

It has been speculated that the fluidized bed of particles may be composed of resilient particles or soft particles and thus may be as large as or larger than the fragile body while offering a cushioning effect to such bodies. However, a bed composed of such particles inherently does not offer the liquid or fluid effect necessary for "floating" fragile bodies of equal or less size in the requisite manner. Additionally the density of appropriately resilient materials coupled with the velocity of fluidizing gas required to effect fluidization of such relatively large particles renders a very low average density of particles will be relatively high momentum. Since the fragile bodies must possess a lower density than the average density of the bed such a bed is impractical.

Further, when spray coating fragile bodies in a fluidized bed, the coating material is dissolved or dispersed within a carrier liquid. The liquid spray coats the bodies and the carrier liquid volatilizes due to the kinetics of energy transfer from the fluidized particles. Such particles may be heated to specific temperatures to effect the desired vaporization within practical periods of time. Such energy transfer is not possible where the fluidized-bed particles are as large as or larger than the fragile bodies because the rapid and frequent contact of finer particles is not present so that even if the use of large resilient particles were practical from a density and fluidization standpoint, it would not be practical to employ such particles in conjunction with a spray coating process.

A wide variety of fragile articles may be coated by the process. The process may be advantageously employed to coat fragile articles which, if subjected to fluidization by themselves, would undergo substantial attrition and breakage. Such articles frequently are hard and/or brittle and possessed of low strength. In many instances, the fragile articles are compressed composites of powdered or granular materials which are only lightly compacted or compressed or bound together. Such articles include numerous pharmaceutical, confectionary, food, and animal feed products, as well as other fragile articles obvious to those in their arts. The articles may be any of numerous diverse shapes and forms, such as pills, lozenges, tablets, pellets and the like. The process is also applicable to articles which are of a configuration or form that would be extremely difficult, if not impossible, to fluidize alone; and, if capable of fluidization, the fluidization conditions would be so violent that impact forces and the like of the fluidized articles with each other would result in breakage and attrition of the fluidized articles. For example, glass and ceramic insulator rings, helices, disks, plates and those shapes which possess fragile projections or are of irregular contours, are extremely difficult to fluidize by themselves except through use of such violent gaseous currents that breakage and attrition result from the fluidization. However, by such shapes of glass, ceramic, or a like material being concurrently fluidized with and supported by fluidized particulate solids, fluidization conditions are less severe (for example, lower velocity gaseous fluidization currents) and substantial breakage and attrition of these forms during fluidization are avoided. The invention permits coating of fragile articles with coatings, such as decorative, protective, antistatic, electrically conductive, catalytic, and the like coatings, while these fragile articles are concurrently fluidized with fluidized particulate solids.

There is a wide selection of materials suitable for the particulate solids which make up the primary fluidized bed in which the fragile articles are concurrently fluidized and coated. In general, a material is selected for the primary fluidized bed of the particulate solids because it can easily be fluidized and is stable at the bed operating temperature. Also considered in the material selection are the nature of materials making up the fragile article being coated and the particular coating being applied. Where the end use of the coated article product is as a food, medicant, confectionary, or the like, the material making up the fluidized particulate solids should be safe from a health standpoint and desirably be a food or edible material. A number of materials meet these safety and health requirements. Among such materials useful in particulate solids form are sodium chloride, tricalcium phosphate, limestone, limestone salt mixtures, and monosodium glutamate; also included under some fluidization conditions are certain foodstuffs such as sugar, rice and other edible grains and seeds, beans, lentils, nut meat fragments, dried chopped carrots, dried kernals of corn, and the like. Particularly useful, where fragile edible articles are being coated, are particulate forms of condiments, such as pepper, salt, sugar, spices, and the like, and mixtures thereof.

The process of the present invention is particularly amenable to the coating of tablets of compressed particulate materials or powders. The parameters of particulate material composition, size and velocity of fluidization are preferably gaged to provide the requisite cushioning effect to prevent attrition and breakage of the tablets. The powders or particulate materials that are fabricated into tablets need be compressed only to the degree necessary to provide sufficient green strength for handling and introduction into the cushioning fluidized bed. The bed itself may be gaged to support tablets of insufficient green strength for coating by any of the prior known means.

Through choice of shapes and forms, particle sizes, materials of particular densities, the fluidizing gas and its velocity, and other variable well known to the fluidization art, one can fluidize several materials concurrently. One material can be completely dispersed and suspended throughout a fluidized bed of another material without substantial settling out of one or more materials or substantial entrainment of one or more materials in the exiting fluidizing gas.

As an illustration of concurrent fluidization of several materials, a superficial velocity of about 1.9 feet per second of air will concurrently fluidize 3600 parts by weight of sodium chloride granules ranging from 75 to 300 microns and about 1350 parts by weight of compressed powder table of a size about ⅜-inch diameter by ⅛-inch thickness of a material of a density somewhat less than that of sodium chloride.

In general, concurrent fluidization of the fragile articles and particulate solids can be carried forth in any of several fluidization apparatuses known to the art. A particularly useful fluidization apparatus generally comprises a vertically positioned tubular chamber within which the concurrent fluidization is carried forth. Such a chamber usually constricts at its bottom to provide an inlet for introduction of a gaseous fluidization means, e.g., air, and has located intermediate the tubular chamber and such an inlet a perforated or porous distribution plate for the introduced fluidization gas. The distribution plate uniformily distributes the introduced fluidization gas and serves as a barrier above which the fluidized bed of materials is constrained. At the top, the tubular chamber generally expands into a larger section to provide a region of decreased gas velocity which minimizes any entrainment of particulate solids in the upwardly flowing fluidizing gas which exits from the top of the fluidization apparatus. As is conventional, the apparatus may be provided with a jacket for the tubular chamber or with other known means permitting control of temperature of the concurrently fluidized materials. Also, the customary means may be provided for cooling or heating, and measuring and regulating the temperature, velocity, and amount of fluidization gas introduced into the apparatus. If desired, any of several conventional means may be included for introduction and removal of the fluidized materials from the tubular chamber with or without interruption of the fluidization. The apparatus also includes a means for introduction of a liquid material into the tubular chamber. Spray means, such as are illustrated in U.S. Patents Nos. 2,600,253, 2,768,095, 2,876,801, 2,954,643, 3,001,228, 3,036,338, and the like, may be included. The apparatus size is generally determined by the magnitude of operation desired for the process. The apparatus is constructed from conventional materials. Of course, where an edible product is being prepared, the materials must be such as are used in conventional equipment for handling and preparing food for consumption. Such materials as stainless steel, aluminum, glass, ceramic materials, and the like, are useful for fluidization apparatus construction, although numerous other construction materials may be used.

While air is used in most instances as the fluidizing gas means, numerous other gases may be used. Such gases as oxygen, hydrogen, nitrogen, helium, carbon dioxide, or variou mixtures of them may be used in various embodiments of the process with due regard for the various materials being employed in that embodiment of the process and for the desired coated product.

A wide variety of coating compositions are useful in the process. The coating composition employed in the process is of a liquid nature. The particular coating composition used depends greatly on the nature of the fragile article and its end application, on the particular fluidization conditions, and on the particulate solids being used. The term "liquid in nature" is intended to mean that the coating composition may be: (1) a solution having coating solids dissolved therein; (2) an emulsion having coating material emulsified therein; (3) a liquid having coating solids dispersed therein; or (4) even a solid coating material in a liquid or liquefied state at the conditions under which it is applied. Where the desired coated fragile article product is for an end application, such as a food, medicant, confectionary, and the like, the fragile articles and the particulate solids must be edible and safe for such purposes. In such instances, the coating and coating composition also must meet the requisite health specifications. Included among liquid coating compositions for such purposes are: melted chocolate; gelatins; sugar solutions; starch solutions; certain natural gum solutions; carbomethyoxy cellulose solutions and numerous other coating compositions well known to those in the foodstuff and pharmaceutical arts. Where the end application of the coated article is not for human or animal consumption, useable liquid coating compositions include: molten or melted thermoplastic synthetic and natural resins ( e.g. rosin); aqueous and organic solutions, dispersions, and emulsions of natural and synthetic resins, such as vinyl chloride, resin plastisols, shellac solvent solutions, various acrylate, methacrylate, and styrene polymers dissolved in one or more solvents such as acetone, toluene, chloroform, dimethylketone, dichloromethane, etc. and various mixtures thereof. If desired, there may be included in the liquid coating composition, such materials as coloring agents; foodstuff dyes and/or flavors; pigments and/or fillers, such as talc, silica, clay, iron oxides, carbon black; and the like. Each may or may not be included depending on the particular end application and properties desired for the coated article product.

In practice, the fluidizing gas current simultaneously maintains the particulate material to be coated and the cushioning bed of solid particles in a fluidized state. Fluidization is not so excessive and violent as to cause attrition or substantial entrainment of either material in the exiting fluidizing gas. Temperature of the fluidizing gas used may not exceed the temperature stability of the various materials being fluidized. For example, the temperature used should neither soften either fluidized material or the applied coating sufficiently to cause agglomeration within the fluidized bed nor be so high as to be detrimental to the chemical and physical properties of the various materials used. With due regard for such a temperature requirement, a wide range of useful temperatures varying from well below to well above the ambient temperature (about 20° C.) are possible. While fluidization usually is at atmospheric pressure or thereabout, fluidization at pressures above and below atmospheric is contemplated as within the scope of the invention.

The ratio of the particulate materials being coated to the particulate solids within the fluidized bed may be varied within wide limits. The weight ratio of particulate solids to fragile articles appears to be unimportant. Generally, unless there are more particles on a number basis of the particulate solids than fragile articles being coated, significant attrition of the articles being coated may occur, probably due to inadequate cushioning effect. Usually the particulate solids constitute a major proportion (i.e., more than 50 percent) of the fluidized bed on the basis of numbers and weight. Obviously to one skilled in the art, due to materials of different densities and sizes, there will be a minimum ratio of one to the other which must be observed. If the minimum ratio is indicated either material will tend to settle out of the fluidized bed and/or be entrained in the exiting fluidized gas.

The rate at which the coating composition is applied to the fluidized bed is important. High rates of application usually are desirable to shorten coating time. However, the rate of coating application must be tailored so as not to cause significant agglomeration or loss of fluidization. Where the coating composition comprises a solid coating material dissolved in a volatile liquid solvent, the temperature of the fluidized bed may be ambient temperature or thereabouts. The liquid solvent rapidly evaporates from the solute which coats the particulate materials in the fluidized bed. Where less volatile liquid constituents of the coating composition are present, higher temperatures of the fluidized bed may be employed. Where a molten or melted solid coating material is employed, also where the coating material is the emulsified phase of the liquid coating composition, the temperature of the fluidized bed should be low enough to congeal or solidify the coating material upon contacting the fluidized fragile articles. Through brief experimentation, one can readily determine what are the useful temperatures and the maximum rate at which various coating compositions may be introduced to the fluidized bed without substantial loss of fluidization or agglomeration of fluidized particles within the bed.

In operation of the process, in a batchwise manner, the fragile article being coated is retained in the fluidized bed and sufficient coating composition introduced into the bed over a period of time providing a desired pick-up of coating agent by the particulate material. At the conclusion of the batch operation, the mass of formerly concurrently fluidized particles may be discharged and the coated product separated from the particulate solids. Usually such separation is readily accomplished by means such as sieves, or the like, based on particle size, but may also be accomplished by other means well known to the art as where other properties or characteristic differences of the various materials are employed to effect a separation thereof.

In a continuous operation of the process, fluidization conditions may be varied, or the fluidization apparatus designed to effect a size gradient or gravity separation of the several materials in the fluidized bed and thus bleed off a portion of one or more of the materials making up the fluidized bed, as desired, to enable separation of coated product without interruption of the continuous coating operation.

In a desirable embodiment of the process, the particulate solids of the fluidized bed are the same as the coating material. In such an operation of the process, these particulate solids may be recovered, reground, and recycled to the bed, or re-used in the coating composition in a continuous or batch operation of the process, as desired.

A typical apparatus suitable for carrying out the process of this invention is illustrated in the drawing wherein the single figure shows, schematically, an apparatus that would operate in the following manner:

Through a solid feeding inlet 10, particles 11 to be coated and inert bed particles 12 are fed into a fluid bed column 13. These particles 11 and 12 are fluidized by fluidizing gas 14 which enters below the fluidized bed 15 and is uniformly distributed into the fluid-bed area 16 by an air distributor plate 17. A rotameter 18 in fluidizing air line 19 measures the amount of air that passes into the fluidized bed 16. A heater 20 heats this air.

The coating solution 21 is metered 22 at a fixed rate into coating solution spray nozzle 23 where said solution is well mixed with the spraying air 26 which also enters into the nozzle 23. From the coating solution spray nozzle 23 a very fine mist of coating material 21 is directed downward into the bed of fluidized particles 11 and 12 where uniform coating is accomplished on the fluidized particles.

Uniformly coated particles 11 are removed from the bed 16 through bed emptying line 24. The coated particles 11 are screened in screener 25 to separate the larger coated particles 11 from the small inert bed particles 12 which fall through the screen.

In the following examples, which serve to more fully illustrate the invention, all parts, percents, and amounts are by weight unless expressly stated otherwise.

Example 1

A liquid coating composition is prepared by dissolving 450 grams of granulated sugar, 18 grams of a finely powdered acacia gum, and 18 grams of granular gelatin in about 300 grams of water. At about 20° C., the resulting composition is a thick dark liquid mixture. This mixture is admixed in a 1:2 parts by weight ratio with ethyl alcohol, and about 3 drops of a red certified-pure food color added thereto, to provide the liquid coating composition used in this example.

The fragile articles coated by this example are commercially available 5 grain aspirin tablets, each weighing about 4 grams and each being about ⅜ inch diameter by ⅛ inch thick. These aspirin tablets, if fluidized by themselves in an air stream, require such a violent air current for fluidization that, within several minutes of fluidization thereof, a significant proportion (greater than 25 percent) of the fluidized aspirin tablets show attrition thereof.

About one pound of granulated sodium chloride, table-salt grade, averaging about 40-mesh size (U.S. Sieve Series) and ranging from about +150 to −20-mesh size, are placed in a vertically positioned, 4" I.D., tubular gas-fluidization apparatus and air of about 20° C. is introduced through a porous distributor plate of the apparatus at about 10 s.c.f.m. to fluidize the granulated sodium chloride. About 100 of the aspirin tablets are then added to the fluidized sodium chloride granules and a concurrently fluidized bed of aspiring tablets and sodium chloride granules results. A fine spray of the coating composition is sprayed on the upper free surface of this concurrently fluidized bed at an average rate of about 3.3 ml. per minute for about 15 minutes. At this time fluidization is discontinued, and the contents of the fluidization apparatus are removed. These contents are gently screened into two portions, one consisting essentially of sodium chloride granules and a portion of the introduced coating composition, and a second consisting essentially of the aspirin tablets which now are coated with a thin, hard, red, surface coating. Examination of the coated aspirin tablets reveals less than 4 percent show any attrition thereof, as apparent from chipped edges or other portions of the tablet being broken off.

Example 2

Example 1 is repeated, wherein aspirin tablets concurrently fluidized with granular sodium chloride are coated with the red sugar-containing coating composition, except that the fluidized air is introduced at a temperature of about 50° C. concurrent fluidization is maintained with air at this temperature and a spray rate of about 3 to 4 ml. of the coating composition per minute for about 5 minutes. An attempt is made to double the rate of application of the coating composition, but this increased rate of spray application is discontinued when there is noted a loss of the concurrent fluidized state. The air flow is continued and in a few minutes a concurrently fluidized bed is observed again. An additional amount of the red sugar-containing coating composition then is sprayed at a rate of 3–4 ml. per minute for about 5–10 minutes. At this time fluidization is discontinued, the column's contents removed, and the coated aspirin tablets separated by screening.

The coating on the aspirin tablets is a hard, uniform, red coating. Cross-sectioning of several coated tablets shows a slight penetration of a red coloration into the aspirin core of the coated tablets. A small number of the coated tablets have chipped edges, but still a substantially smaller proportion of tablets is chipped than if the aspirin tablet had been fluidized by air in the absence of concurrently fluidized particulate solids, such as the granulated sodium chloride.

Example 3

In a manner similar to Examples 1 and 2, about 100 of the aspirin tablets are concurrently fluidized with about one pound of the granulated sodium chloride with air of about 50° C. A coating composition is prepared by adding several drops of a blue dye to a 10 percent by volume solution of Acryloid B-21 (Acryloid A-21 is a clear acrylic coating composition believed to contain about 30 parts of methylmethacrylate resin solids dissolved in 70 parts of a 9:1 toluene-butanol mixture) in toluene. About 25 ml. of this coating composition are sprayed onto the upper free surface of the concurrently fluidized materials in about 20 minutes. Both the tablets and the sodium chloride granules pick up color from the introduced coating composition. On two occasions a loss of concurrent fluidization occurred. However, upon discontinuing the introduction of the sprayed coating composition while continuing the air introduction, the concurrent fluidized state is quickly regained with additional coating composition then being introduced.

The resulting coated tablets, after removal from the apparatus, have a blue, hard, surface coat thereon. No substantial penetration of blue color into the tablets is noted. A few tablets have chipped edges, but these constitute a smaller proportion of chipped tablets than if the aspirin tablets are fluidized and coated in the absence of concurrently fluidized particulate solids.

Example 4

Example 3 is repeated except that the several drops of blue dye are omitted from the coating composition and the coating composition is sprayed onto the concurrently fluidized bed of tablets and granules in an amount of 35 ml. in 25 minutes. The resulting coated tablets possess a clear, hard, nonglossy surface coating.

Example 5

About 100 of the aspirin tablets are concurrently fluidized with about one pound of the granulated sodium chloride employing air of about 50° C. to fluidize the same. A coating composition consisting essentially of a small amount of a dye in a 1:1 mixture of acetone and a commercially available synthetic lacquer is sprayed into the concurrently fluidized bed with about 30 ml. of the coating composition being introduced in 25 minutes. Drying of the introduced coating composition occurs slowly in the concurrently fluidized bed. Loss of concurrent fluidization is noted several times, but each time, upon cessation of the spraying, concurrent fluidization returns and then spraying is recommenced.

The resulting product has no apparent chipped edges and has a hard, surface coating on the aspirin tablet. Salt granules adhere to a number of the coated tablets. Some tablets have picked up sufficient coating and have sufficient salt adhering thereto so as to be almost spherical.

Example 6

Eight pounds of the granulated sodium chloride, of the granulation as employed in previous examples, are concurrently fluidized by 22 s.c.f.m. of air of a temperature of about 93° C. in a vertically positioned, 8-inch I.D. tubular gas fluidization apparatus, along with about 200 grams of fragile oblong placebos. The fragile oblong placebos each weigh about 0.22 gram and are about 7/16-inch long by 7/32-inch wide by 3/16-inch thick (outside dimensions).

A coating composition, consisting essentially of 416.5 grams of Acryloid A-21 solution (believed to contain about 30 percent by weight of methacrylate resin) is dissolved in 84.1 grams of butyl alcohol and 750 grams of toluene, to which is added 20 grams of an oil red color. The solution is sprayed through a two-fluid nozzle, about 12 inches above the upper free surface of the concurrently fluidized bed, using air pressure of 40 p.s.i. for about 27 minutes. At this time the placebos are removed from the fluidization apparatus and separated from the granulated sodium chloride. The separated placebos are found to be very uniformly coated with some coated placebos having some sodium chloride granules adhering to their coating. No breakage or chipping of the coated granules is noted.

Example 7

Example 6 is repeated except that there is concurrently fluidized with the granulated sodium chloride about 100 grams of the fragile oblong placebos and about 100 grams of fragile round placebos, each round placebo about 5/16-inch diameter by 1/8-inch thick and weighting about 0.2 gram. As in Example 6, the coating composition containing Acryloid A-21 is sprayed, except for about 50 minutes, onto the concurrently fluidized bed. A product, like that of Example 6, is obtained in that all placebos are uniformily coated, with some having a few salt granules adhering to their coating and with no evidence of breakage or chipping of the coated placebos.

Example 8

Three pounds of fragile round placebos, like those employed in Example 7, are concurrently fluidized by about 38.5 s.c.f.m. of air with eight pounds of granulated sodium chloride of the same granulation as employed in the preceding examples. A coating composition like that used in Examples 6 and 7 is employed in this example and is sprayed through two nozzles. For the first 25 minutes the coating composition is sprayed at the rate of 10 ml. per min.; for the next 15 minutes it is sprayed at the rate of 20 ml. per min.; and for the last 10 min. it is sprayed at the rate of 40 ml. per min. Small samples of fluidized granulated sodium chloride and placebos are removed from the fluidization apparatus, without interruption of the concurrent fluidization, every three minutes for the first 15 minutes and then every five minutes thereafter. The removed coated placebos have a smooth shiny surface coating and the coated placebos removed during the latter portion of the coating process appear to have some penetration of the colored coating solution into the placebo, per se.

Example 9

One pound of fragile round placebos, like those employed in preceding examples, is concurrently fluidized with eight pounds of granulated sodium chloride of the granulation as employed in preceding examples. Concurrent fluidization is by air of about 93° C. at 33 s.c.f.m.

A spray nozzle, about 12 inches above the upper free surface of the fluidized bed, is employed to spray, at 40 p.s.i. pressure, a coating composition like the Acryloid A–21 containing composition used in some preceding examples. Spraying is at a rate of 15–20 ml. per minute for about 15 minutes.

Then, there is sprayed at about the same rate for about 9 minutes a 5 percent solution of commercially available Acryloid A–21 diluted with toluene. The resulting placebos are found to be coated with a smooth uniform two-layer coating, i.e., an outer clear coating and an inner red coating, encapsulating each round placebo.

Example 10

There are concurrently fluidized about eight pounds of granulated sodium chloride, of the granulation as employed in the preceding examples, and 152 fragile tablets containing 25 mg. or 400,000 units of a synthetic penicillin. Fluidization conditions are substantially the same as those of Example 9, except the introduced air is of a temperature of about 65° C. and about 15 to 20 ml. per minute of the coating composition are introduced for about 21 minutes. The coating composition employed consists essentially of about a 5 percent solution of polyvinyl pyrrolidine (about 25 grams of polyvinyl pyrrolidine dissolved in 475 gams of water containing about 1 percent of a certified-pure red food coloring). Of the resulting coated tablets, a few are coated over their entire surface and the remainder are coated in a spotty manner only on portions of their surface.

These coated tablets can be returned to the apparatus and this example repeated to place additional coating thereon, if desired.

Example 11

There are concurrently fluidized about eight pounds of granulated sodium chloride, of the granulation as employed in the preceding examples and three types of fragile tablets. The concurrently fluidized tablets are: 100 each of the spotty coated tablets resulting from Example 10; 152 tablets containing potassium phenethicillian along with antihistamine and analgesic components, and 500 fragile round placebos, each about ⅛-inch diameter. Fluidization conditions are substantially the same as those of Example 9, except that the air is introduced at a temperature of from 65° C. to 82° C. and the coating composition is introduced at a rate of 20 ml. per minute for 30 minutes. The coating composition employed in this example is about a 10 percent aqueous solution of polyvinyl pyrrolidine containing about 2 percent of a certified-pure red food coloring. All of the resulting coated fragile tablets are found to be substantially free from any attrition or breakage thereof and have a surface coating thereon.

Example 12

A plurality of about ½-inch diameter spherical composites, consisting essentially of chopped roasted peanuts bound loosely together by a hardened carmel-base syrup, is concurrently fluidized with a mass of chopped roasted peanuts of a particle size approximately +60 to −8-mesh, U.S. Sieve Series. A 60° C. coating composition, consisting essentially of melted chocolate is sprayed into the fluidized bed in an amount to coat the concurrently fluidized composites. The resulting product is a coated composite consisting essentially of a core of chopped roasted peanuts bound together by a hardened carmel syrup and a surface coating on the core of congealed chocolate having adhered thereto chopped roasted peanut particles. This coated product is edible and found to be quite tasty.

Example 13

A plurality of congealed droplets of molten chocolate is concurrently fluidized with a mass of granulated sugar of an average particle size of about 50-mesh, U.S. Sieve Series, by air at a temperature of about 30° C. The concurrently fluidized congealed chocolate droplets are coated with a hardened sugary coating by introducing a spray of an aqueous sugar-containing coating composition into the fluidized bed. The resulting coated product, consisting essentially of a chocolate core surface coated with a hard sugary shell, is quite edible.

Example 14

A plurality of 50 ml. size, laboratory, thin-walled, porcelain crucibles is concurrently fluidized in a mass of fine porcelain chips by nitrogen gas, and, while concurrently fluidized, are sprayed with a thin coating of a solution of chloroplatinic acid in oil of lavender. The temperature of the nitrogen gas used for fluidization then is raised to a temperature sufficient to dry the wet coating and to reduce the platinum compound so as to leave a thin film of platinum on the porcelain crucibles. The preceding process sequence then is repeated for a number of times, as desired, so as to build up a platinum coating of a desired thickness on the crucibles. These platinum coated crucibles are useful in many laboratory chemical applications. For economic operation, the mass of fine porcelain chips usually is subsequently chemically treated to recover platinum residues accumulated by the chips.

Example 15

Fragile porous briquettes of loosely pressed powdered charcoal are concurrently fluidized with powdered charcoal by about ambient-temperature air. A hot (about 80° C.) liquid coating composition consisting essentially of paraffin wax dissolved in chloroform is sprayed onto the upper free surface of the fluidized bed until a desired amount of wax has been introduced. The resulting briquettes are wax-coated, are less frangible than when uncoated, can be ignited easily, and can be exposed to wet environments without substantial absorption of water.

In this process, economic operation dictates recovery by conventional means of chloroform vapors from the air exhausted from the fluidized bed. Also, the used powdered charcoal of a batch operation usually is admixed with powdered charcoal and employed to press charcoal briquettes for other process batch operations with fresh powdered charcoal being employed as the primary fluidized bed in each batch operation. In continuous operation, the current of fluidizing air is so controlled that the briquettes after pickup of a sufficient paraffin wax coating settle by gravity from the fluidized bed. They are removed, and additional uncoated briquettes are introduced into the fluidized bed. Also, in continuous operation, a portion of the powdered charcoal is bled from the bed and additional fresh charcoal introduced to replace the powdered charcoal removed.

As will be apparent from the preceding description and examples, the invention is of broad application. It can be used in many applications with numerous articles and materials. An exhaustive listing of all such useful articles and materials, and applications of the process has not been attempted. Instead, it is to be understood that all such articles, materials, and applications are encompassed by the invention without departing from its true spirit and scope and that the invention is to be limited only as set forth in the appended claims.

It will be understood that the term "composite fluidized bed" as it is used in the present specification and claims means a substantially coexistent fluidized bed of different particles. Such a bed need not be completely homogeneous and uniform in the existence and concentration of the two differing particulate materials, however, there must be some intermingling of the two particulate materials. Such a bed is automatically created where large particles (such as the fragile bodies described in the present specification) of a material of less density than a fluidized bed of smaller particles are introduced into such a bed. Where the large particles or bodies are of the same or greater specific gravity than the fluidized bed of smaller particles such larger particles will sink to the bottom of the bed and/or stratify into a separate and lower bed and defeat the purpose of the present invention.

What is claimed is:

1. A process for coating fragile bodies that are subjected to breakage and attrition when fluidized comprising:
    (a) forming a fluidized bed of particulate solids having an average bed density that is greater than said fragile bodies and an average particle size that is smaller than said fragile bodies;
    (b) introducing said fragile bodies into said fluidized bed so as to form a composite fluidized bed; and
    (c) introducing a spray of said coating material into said composite fluidized bed so as to coat said fragile bodies with said coating material.

2. The process as set forth in claim 1 wherein the average particle size of said fluidized bed of particles is no greater than about ⅕ the size of said fragile bodies.

3. The process as set forth in claim 1 wherein the average diameter of the particles of said fluidized bed of particles is no larger than about ⅕ of the average diameter of said fragile bodies.

4. The process set forth in claim 1 wherein said coating material is introduced into said composite fluidized bed in the form of a solution that consists essentially of the coating material and a volatile liquid that is disposed to evaporate in said composite fluidized bed and leave a coating on said fragile bodies.

5. The process set forth in claim 1 wherein said fragile bodies consists of compressed particulate solids with sufficient green strength for fluidization in a composite fluidized bed of said particulate solids and said fragile bodies.

6. The process set forth in claim 1 wherein at least 50 percent of said composite fluidized bed consists numerically of said particulate solids.

7. The process as set forth in claim 3 wherein said coating material is introduced into said composite fluidized bed in the form of a solution that consists essentially of a coating material and a volatile liquid that is disposed to evaporation in said composite fluidized bed and leave a coating on said fragile bodies and at least 50 percent of said composite fluidized bed consists numerically of said particulate solids.

8. The process as set forth in claim 5 wherein said coating material is introduced into said composite fluidized bed in the form of a solution that consists essentially of a coating material and a volatile liquid that is disposed to evaporate in said composite fluidized bed and leave a coating on said fragile bodies and at least 50 percent of said composite fluidized bed consists numerically of said particulate solids.

9. The process as set forth in claim 7 wherein energy is introduced into said composite fluidized bed that is disposed to facilitate vaporization of said volatile liquid.

10. The process as set forth in claim 8 wherein energy is introduced into said composite fluidized bed that is disposed to facilitate vaporization of said volatile liquid.

References Cited

UNITED STATES PATENTS

| | | | |
|---|---|---|---|
| 1,534,846 | 4/1925 | Fraser et al. | 117—100 X |
| 2,586,818 | 2/1952 | Harms | 259—4 |
| 2,768,095 | 10/1956 | Tadema et al. | 117—100 |
| 2,789,034 | 4/1957 | Swaine et al. | 23—177 |
| 2,856,351 | 10/1958 | Welty et al. | 208—140 |
| 2,865,868 | 12/1958 | McKinley et al. | 252—467 |
| 2,870,002 | 1/1959 | Johnson | 75—9 |
| 2,987,413 | 6/1961 | Dettling | 117—21 |
| 3,066,017 | 11/1962 | Jahnig | 23—288 |
| 3,089,824 | 5/1962 | Wurster | 167—182 |
| 3,112,220 | 11/1963 | Heiser et al. | 117—100 |
| 3,202,731 | 8/1965 | Grevenstuk et al. | 264—7 |
| 3,205,042 | 9/1965 | Jacobson | 23—208 |

WILLIAM D. MARTIN, *Primary Examiner.*

M. SOFOCELEOUS, E. J. CABIC,
*Assistant Examiners.*